United States Patent [19]

Berglas

[11] 3,920,969

[45] Nov. 18, 1975

[54] DIGITAL GLUCOSE ANALYZER

[76] Inventor: Robert E. Berglas, 30 E. End Ave., New York, N.Y. 10028

[22] Filed: Jan. 31, 1974

[21] Appl. No.: 438,465

[52] U.S. Cl.......... 235/151.3; 23/230 B; 23/DIG. 2; 128/2 R; 128/2.1 E; 204/1 T; 204/195 B; 235/151.35
[51] Int. Cl.² .................. G01V 1/28; G01N 31/00; A61B 5/04
[58] Field of Search.................. 235/151.3, 151.35; 23/230 B, 253 R, DIG. 2; 204/195 R, 195 B, 1 T; 235/151.12; 340/236, 347 AD, 347 NT; 128/2, 2.1

[56] References Cited
UNITED STATES PATENTS

| | | | |
|---|---|---|---|
| 2,985,830 | 5/1961 | Coulter et al. | 128/2 E |
| 3,542,662 | 11/1970 | Hicks et al. | 204/1 T |
| 3,626,164 | 12/1971 | Pontigny et al. | 235/151.3 |
| 3,653,841 | 4/1972 | Klein | 23/230 B |
| 3,697,978 | 10/1972 | Prill | 340/347 AD |
| 3,749,089 | 7/1973 | Derr | 128/2.1 E |
| 3,770,607 | 11/1973 | Williams | 204/195 B |
| 3,817,239 | 6/1974 | Kuntz | 128/2 R |
| 3,824,453 | 7/1974 | Baker | 204/1 T |

OTHER PUBLICATIONS

Chang et al.; "Validation and Bioengineering Aspects of an Implantable Glucose Sensor;" Vol. XIX, Trans. Amer. Soc. Artif. Int. Organs, 1973, pp. 352–360.

Blaedel et al.; "Continuous Analysis by Measurement of the Rate of Enzyme Catalyzed Reactions–Glucose Determination;" Analytical Chemistry, Vol. 34, No. 3, Mar. 1962, pp. 388–394.

*Primary Examiner*—Malcolm A. Morrison
*Assistant Examiner*—Errol A. Krass
*Attorney, Agent, or Firm*—Cushman, Darby & Cushman

[57] ABSTRACT

A system for producing a display of the amount of glucose in a urine or serum sample including conventional sense and reference electrode adapted for placement in a urine or serum sample to produce a differential voltage signal which varies as a function of the amount of glucose in the sample, an amplifier to amplify this differential voltage, an analog to digital converter for providing a binary output, conventional binary coded decimal to seven segment decoder/driver circuits which provide outputs to incandescent displays which can provide seven segment outputs in any desired colors.

1 Claim, 2 Drawing Figures

DIGITAL GLUCOSE ANALYZER

BRIEF DESCRIPTION OF THE PRIOR ART AND SUMMARY OF THE INVENTION

The invention relates to a system for producing a display of the amount of glucose in a urine or serum sample.

Glucose saturation in urine, and also in serum, is an extremely important index in modern clinical medicine. No other single, preliminary standard gives such a complete indication of the patient's general health and metabolic functions. Further, urine glucose analysis is the primary way that diabetes in its many stages is detected. Despite the importance of this test, techniques in use today for determining the amount of glucose, particularly in urine, are not only inaccurate and gross in approximation, but are also complicated and require considerable skill and time to provide the desired information.

The usual gross technique for determining saturated glucose is to place a strip of treated paper which changes shades of color in presence presence of saturated glucose in a container of urine. This is a simple colorimetric determination which is, of course, basic to elementary quantitative chemistry.

Where some information with regard to the actual percentage of glucose is required, a reagent dye is added, drop by drop, to the sample and the change of color of the sample compared to a standard reference color. This may be done manually by the lab worker or in automated systems available in the market place. Such automated systems include colorimeters which tend to drift, requiring standard samples to be run alternately with samples to be checked. Because of the inherent drift of automated systems, the results seldom have the degree of accuracy available with the older more time-consuming manual techniques.

A further drawback to the existing techniques is that results can be produced generally only in the presence of large saturations of glucose and are generally inaccurate. Accordingly, a physican is unable to determine how a patient is responding to varying levels of medication which may not be reducing his glucose level by substantial amounts. Yet such information would be of immense value to the physican in judging what medicines are working and what levels should be prescribed.

The present invention relates to a system which can quickly, simply and accurately provide a display of urine and serum glucose. This system can be used in a doctor's office by a relatively unskilled operator and does not require frequent checking with standard samples. The system provides a digital, visual readout which can be easily seen and used.

In the system of this invention as described in detail below a pair of conventional electrodes of the type available in the market place are adapted for placement in a sample of urine or serum. These electrodes produce a differential voltage which varies as a function the amount of glucose in the urine. This differential voltage is amplified by a circuit described in detail below and thereafter converted to a digital signal appropriate for controlling a conventional display which gives an indication, quickly, simply, and accurately, of the amount of glucose in the urine or serum sample.

The amplification of the differential signal is preferably carried out by an amplifier which is described below and which provides a high input impedance and a low input bias current. The circuitry for providing the analog to digital conversion preferably includes an analog to digital converter, employing counters and providing an output to a pair of four bit binary coded decimal adders or other BCD converter. These circuits in turn provide outputs to conventional binary coded decimal to seven segment Decoder/Driver circuits which provide outputs to two display units. Seven segment incandescent displays which can filter outputs in any of a number of colors are preferred for the display.

Many other objects and purposes of the invention will be clear from the following detailed description of the drawings.

DETAILED DESCRIPTION OF THE DRAWINGS

Figure 1:
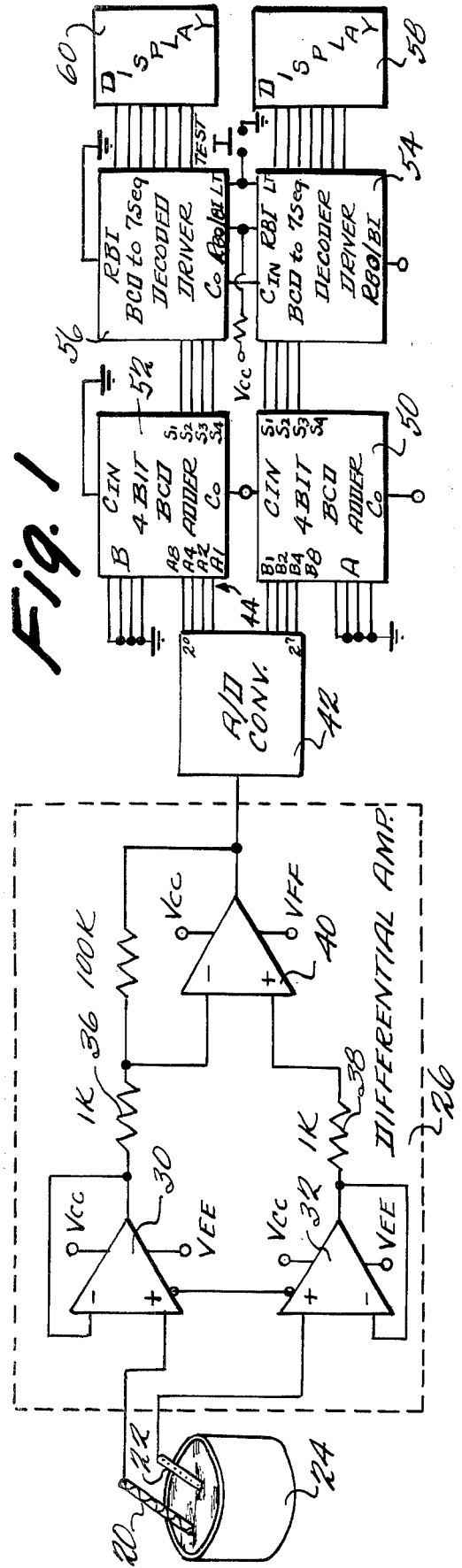
FIG. 1 shows a block diagram of the unique system of this invention.

Reference is now made to FIG. 1 which shows a schematic of the system. Two electrodes 20 and 22 are adapted for placement in a container 24 into which can be placed a sample of urine or serum that is to be analyzed for glucose. One of these electrodes is a sense electrode while the other provides a reference so that the differential voltage produced between the two electrodes when they are placed in container 24 varies as a function of the glucose content of the sample. These electrodes are discussed in greater detail in an article by D. A. Gough, entitled "Enzyne Electrodes," *Science*, April 27, 1973 and in U.S. Pat. No. 3,542,662. The disclosure of this article and patent are explicitly incorporated herein by reference.

The differential voltage produced between electrodes 20 and 22 is amplified by a differential amplifier 26. More particularly, the voltage signal appearing at electrode 20 is applied to the plus input of an operational amplifier 30, while the voltage appearing at electrode 22 is applied to the plus input of operational amplifier 32. The outputs of amplifiers 30 and 32 are respectively applied via resistance 36 and 38 to the negative and positive inputs to a further operational amplifier 40. The output of operational amplifier 40 thus is an amplified signal which varies as a function of the difference between the voltages appearing at the electrodes 20 and 22 and accordingly varies as a function of the glucose content of the sample in container 24.

Differential amplifier 26 has been found to be particularly satisfactory for the circuit. This amplifier has a very high input resistance — on the order of $10^{12}$ — and also provides a low input bias current, for example 10 microamps over the entire temperature range. While this differential amplifier has been found to be particularly satisfactory, other similar amplifiers can of course be employed.

The output of differential amplifier 26 is applied to analog to digital converter 42 which receives the amplified analog signal provided at the output of differential amplifier 26 and converts that signal to a binary signal appearing at the eight output lines indicated in general as 44. It is desirable to convert this information to binary coded decimal form in order to drive conventional Decoder/Driver sections. Accordingly, in FIG. 1 a pair of binary coded decimal adders 50 and 52 are coupled to lines 44 for converting the output of converter 42 into the binary coded decimal form. A Signetics 82S83 four bit binary coded adder is a high speed Schottky MSI circuit which is available and performs this function satisfactorily. This circuit produces the binary coded decimal sum of two decimal numbers presented in the 8-4-2-1 weighted BCD format. Binary to BCD conversion is obtained by applying any four bit binary number to the $A_X$ or $B_X$ inputs while the remaining inputs are grounded. For input codes 0–9, a BCD number result at the output is usual. While this type of converter has been found to be particularly satisfactory, any other conventional unit such as the Texas Instrument SN74185A which provides similar functions can be alternatively employed.

The BCD outputs of adders 50 and 52 are next applied to Decoder/Driver circuits 54 and 56 which convert the BCD input into seven segment signals appropriate for driving conventional displays. The Signetics 8T04, Texas Instruments SN7447, RCA CD 2500E or the like have been found suitable for this purpose. All of these circuits are monolithic MSI 7-segment Decoder/Drivers that have been designed with TTL techniques. They consist of the necessary logic to decode a four bit BCD input and provide the necessary outputs to drive a seven segment digital display. Numerals 0–9 as well as selected signs and letters can be decoded for driving several types of readouts including light emitting diodes and incandesence displays such as the RCA Numitron. A ripple blanking input (RBI) and ripple blanking output (BRO) are used to suppress the leading and trailing edges on multi-digit displays. In addition, the internal logic design allows the ripple blanking output to serve as a blanking input as well and is therefore designated as RBO/BI. This blanking input (BI) overrides the ripple blanking signal and may be used in various blanking and intensity modulation applications. A lamp test input is provided and is independent of any other input so that it may be activated at any time. This input allows the integrity of the display to be checked by overriding all other input states. Normally the display indicates all eight when the test input is activated.

The driver circuits 56 and 54 are applied to a conventional displays 58 and 60. Either light emitting diodes or incandesent displays such as the RCA Numitron 2000 are preferred. Nixie tubes could possibly be used but such require a high voltage and deteriorate with age. Incandescent displays, however, are favored since light emitting diodes normally provide a sharp red light emission. The Numitron with its wide spectrum light emission permits filter selection for a wide variety of color displays. Most personnel associated with the medical community do not like red emissions since it normally signifies a danger condition. In addition, the Numitron readouts provide high contrast, clutter-free displays viewed against a dark background. The unit has a higher reliability and will operate for about 100,000 hours. The operation is low voltage and a wide viewing angle is provided. Further, the unit uses standard low cost sockets or can be mounted directly on a printed circuit board and is free from induced or radiated interference. Finally, the Numitron unit is fully compatible with low cost Decoder/Driver such as discussed above.

Circuits for controlling the brightness of the Numitron unit and for providing suitable voltage levels normally would be provided.

Figure 2:
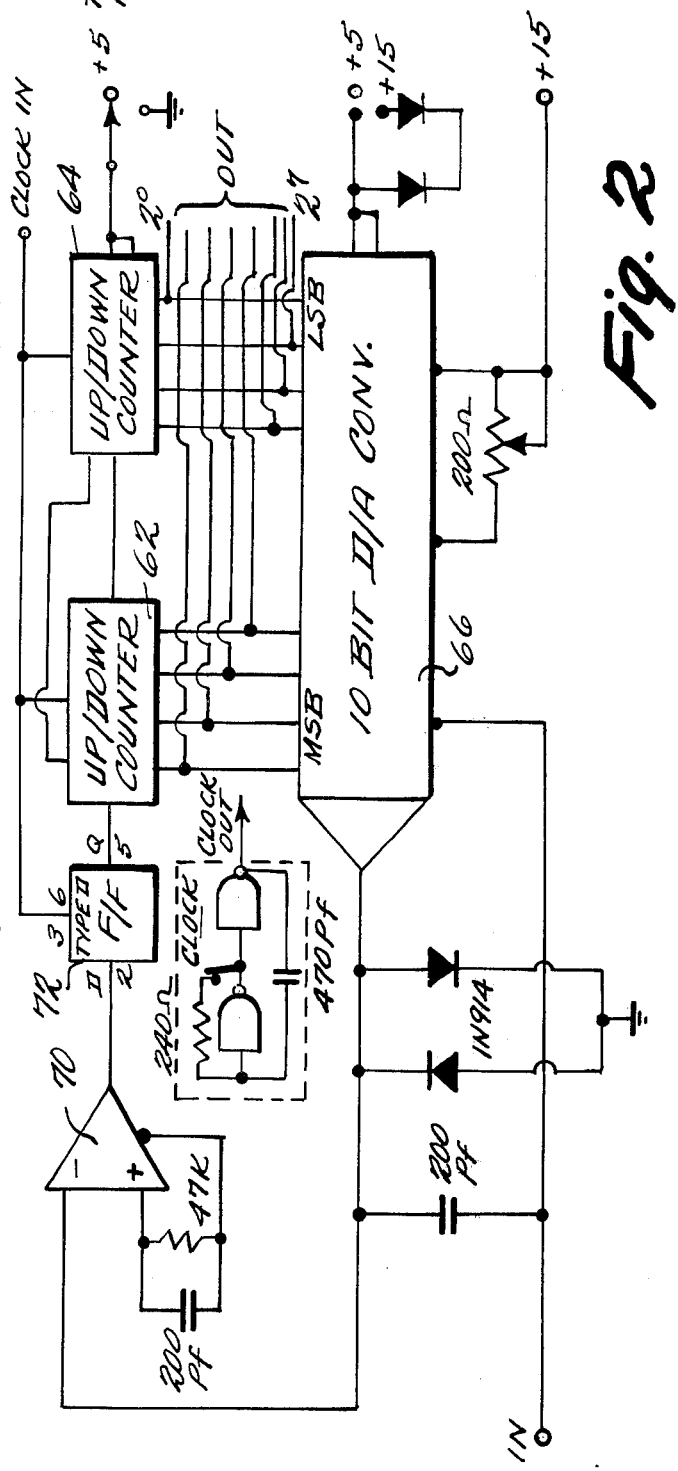
FIG. 2 shows a schematic of the analog to digital converter shown as a block in FIG. 1.

Reference is now made to FIG. 2 which illustrates in detail the analog to digital converter 42. There are several popular styles of A/D Converters based on using a D/A converter in a feedback configuration. The three most common are : ramp or count-up; tracking or servo; and successive approximation.

Ramp types produce one conversion per each 2n clock counts for an $n$-bit converter and are suitable only for very slowly changing analog data. Additionally, the data can be taken out only at the end of the conversion period. Ramp types are the simplest of the available A/D designs. This type generates a time gate signal whose length is proportional to the unknown analog voltage. This gate allows a series of oscillator clock pulses to pass into a counter. The number of pulses passed in proportional to the length of the gate pulse. These clock pulses are converted to a digital number in whatever code is desired: Binary, BCD, gray, or other.

Successive approximation types are quite fast, requiring only n clock counts for conversion, at the expense of considerably more digital complexity. They are capable of encoding fast-moving analog signals if an external sample-and-hold circuit is used to stop the analog data. The digital output is true only at the end of the conversion period.

For the present invention, tracking A/D converters provide adequate speed, while costing approximately the same as simple ramp types. An additional advantage is that no sample-and-hold circuit is required, and the digital data is continuously available at the output. Accordingly while ramp and approximation type circuits can be employed, a tracking A/D converter is preferred.

The tracking A/D is a relatively simple system, both in concept and in practice. The basic design requires but three major elements: up/down counters 62 and 64 in this application or a 10 bit current output D/A converter 66, and a operational amplifier 70 functioning as a voltage comparator.

The voltage at the input to operational amplifier 70 will be the result of the analog input voltage minus output sink current times $R_{in}(V_o=V_{in} - 1_1 \cdot R_{in})$ of converter 42. Assuming a perfect amplifier 70, if the output voltage ($V_o$) is above ground, the amplifier 70 output will be low, causing the up/down counters 62 and 64 to increase the output sink current of converter 42 by one least significant bit. The counter actually counts down one count; this results from the converter's 42 utilization of complementary logic, i.e., an all-zero input produces maximum output current of converter 42. Amplifier 70 continues to examine the output voltage for polarity, and always drives the counter's code in the direction which causes the output voltage to approach zero. Once a balance is achieved, the loop is "locked," and tracks the analog input signal so long as the loop slew rate is not exceeded. When the loop is balanced, the converter 42 output is the binary-coded equivalent of the analog input. When encoding a DC input signal, the digital output will "dither" or alternate between the two adjacent states which span the theoretically correct output value.

A "Type-D" flip-flop 72 is inserted between operational amplifier 70 and counters 62 and 64 up/down input. This is to insure adequate set-up time between operational amplifier 70 output change and the counters 62 and 64 next state change.

After the positive clock transition, counters 62 and 64 change to their next state and drive converter 66 to its new output. After converter 66 has settled and come to its final state, the next positive clock transition loads the amplifier 70 new state into flip-flop 72 and the cycle repeats.

Performance of the completed analog to digital converter 42 is quite impressive despite the low cost and small size. Using clock rates of 3.5MHz, 10V p-p signals can be accurately tracked to frequencies of about 4.5KHz. Higher frequencies can be accommodated by reducing the peak-to-peak amplitude. This is equivalent to a loop slewing rate of about 0.135V/microsecond; the 10-bit version slews at approximately 0.025V/microsecond.

Many changes and modifications of the above described embodiment of the invention are possible without departing from the scope of the invention. Accordingly, that scope is intended to be limited only by the scope of the appended claims.

What is claimed is:

1. A system for producing a display of glucose in solution comprising:

a sense and reference electrode adapted for placement in a container of solution for producing a differential voltage which varies as a function of the amount of glucose in said solution, means connected to said electrodes for amplifying said differential voltage and providing an amplified analog signal including a first differential amplifier having one polarity input connected to said reference electrode and an output, a second differential amplifier having one polarity input connected to said sense electrode and an output, a third differential amplifier having one polarity input connected to said output of said first differential amplifier and the other polarity connected to said output of said second differential amplifier and having an output providing said amplified, analog signal.

means connected to said amplifying and providing means for converting said analog signal into a digital signal including a tracking analog to digital signal converter having counter means and providing a binary output, a binary to binary coded decimal converter connected to said analog to digital signal converter for converting said binary output into a binary coded decimal output, and a binary coded decimal to 7 segment Decoder/Driver connected to said binary to binary coded decimal converter for converting said binary coded decimal output into a 7 segment signal, and display means connected to said converting means for receiving said digital signal and producing a visual display of the glucose value associated with said digital signal wherein said display means includes two, 7-segment, incandescent display units.

* * * * *